United States Patent
Kuehm et al.

(10) Patent No.: US 8,214,561 B2
(45) Date of Patent: Jul. 3, 2012

(54) PERIPHERAL INTERFACE AND PROCESS FOR DATA TRANSFER, ESPECIALLY FOR LASER SCANNING MICROSCOPES

(75) Inventors: Andreas Kuehm, Jena (DE); Nico Presser, Jena (DE); Gunter Moehler, Jena (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 400 days.

(21) Appl. No.: 12/379,193

(22) Filed: Feb. 13, 2009

(65) Prior Publication Data

US 2009/0228618 A1 Sep. 10, 2009

(30) Foreign Application Priority Data

Feb. 15, 2008 (DE) .................. 10 2008 009 634

(51) Int. Cl.
*G06F 3/00* (2006.01)
(52) U.S. Cl. .................. 710/57; 710/1; 710/22; 710/31; 710/52; 710/56; 709/213; 709/215; 711/173
(58) Field of Classification Search .................. None
See application file for complete search history.

(56) References Cited

U.S. PATENT DOCUMENTS

| | | | | |
|---|---|---|---|---|
| 5,845,153 A | * | 12/1998 | Sun et al. | 710/56 |
| 5,862,409 A | * | 1/1999 | Yoshimoto et al. | 710/57 |
| 5,960,215 A | * | 9/1999 | Thomas et al. | 710/52 |
| 5,966,734 A | * | 10/1999 | Mohamed et al. | 711/173 |
| 7,610,413 B2 | * | 10/2009 | Pope et al. | 710/36 |
| 2005/0058372 A1 | * | 3/2005 | Engelmann et al. | 382/312 |
| 2005/0149635 A1 | * | 7/2005 | Otsuka et al. | 710/1 |
| 2005/0177657 A1 | * | 8/2005 | Pope et al. | 710/36 |
| 2006/0129353 A1 | * | 6/2006 | Hattori et al. | 702/183 |
| 2007/0162652 A1 | * | 7/2007 | Go et al. | 710/22 |
| 2007/0174411 A1 | * | 7/2007 | Brokenshire et al. | 709/213 |

OTHER PUBLICATIONS

'Determining Free Physical RAM and Using It to Improve Your Application' by Greg Nakhimovsky, Mar. 17, 2004, copyright Sun Microsystems, Inc.*
'CS322: Memory Management' by R. Bjork of Gordon College, revised and converted to HTML by J. Senning of Gordon College, Mar. 1998.*

* cited by examiner

Primary Examiner — Steven Snyder
(74) Attorney, Agent, or Firm — Jacobson Holman PLLC (57) ABSTRACT

A peripheral interface and process for data transfer, especially for laser scanning microscopes. The peripheral interface permits a gap-free transfer of data with high transmission speed using a non-real-time-enabled operating system of the control computer. A peripheral connection for a peripheral device and a control unit serving for one-way transmission of a predetermined amount of data from the control computer to the peripheral device and/or vice versa accesses via a system bus of a control computer, a work memory region of the control computer serves as buffers preassigned to it, where the control unit prepares for the control computer a progress report of the transfer for retrieval and the control unit of the control computer is informed of the progress of the processing of the buffer independently of the transfer.

16 Claims, 3 Drawing Sheets

PERIPHERAL INTERFACE AND PROCESS FOR DATA TRANSFER, ESPECIALLY FOR LASER SCANNING MICROSCOPES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING, A TABLE, OR A COMPUTER PROGRAM LISTING APPENDIX SUBMITTED ON A COMPACT DISC

Not applicable.

BACKGROUND OF THE INVENTION (1) Field of the Invention

The invention relates to a peripheral interface in the form of a computer connector for a system bus of a control computer, a peripheral connector for a peripheral device and a control unit serving for one-way transmission of a predetermined amount of data from the control computer to the peripheral device and/or vice versa. The control unit accesses via the system bus a working memory range of the control computer preassigned to it. The working memory range acts as a buffer. The present invention also concerns a process for transmitting data from a control computer to a peripheral device and/or vice versa.

(2) Description of Related Art Including Information Disclosed Under 37 CFR 1.97 and 1.98

A peripheral interface provides communication between a control computer and one or more peripheral devices by electronic data transfer. Conventionally, peripheral devices are connected via standard interfaces such as USB (universal serial bus), Ethernet or Firewire, which provide a separate bus on the peripheral side. The data transmission of the peripheral interface is essentially controlled by the control computer, more precisely by its central processing unit, CPU. This is usually accomplished by driver software [a computer program] executed by the CPU, which triggers the ability of the interface device to access working memory (random access memory (RAM)), and the control computer. Access to the RAM is accomplished cyclically by direct memory access, DMA, via the system bus of the control computer. The peripheral interface has a DMA controller for this purpose. Typically, the DMA controller transmits a data block in each DMA cycle. The size of the data block generally corresponds to a single memory page of the RAM. In the case of a large quantity of data, accordingly, a large number of data blocks must be transferred. Therefore, a corresponding number of DMA cycles is required.

The driver software reports each DMA cycle to the DMA controller of the peripheral device. The control computer then executes other software, e.g. an application program with user interaction. Later, the control computer receives confirmation of the complete transfer in the form of an interrupt request, IRQ. In response to the interrupt request, the regular program execution is interrupted and in its place the driver program executes. The driver program continues the data transmission by initiating the next DMA cycle. To achieve a high constant data transmission speed, the driver software must react quickly upon such an interrupt request in order to initiate the next DMA cycle at the right time. Especially in a real-time critical system, a maximal reaction time may not be exceeded in order to prevent gaps in the data transfer. However, if the control computer uses a non-real-time-enabled operating system, a deterministic treatment of an interrupt request for a DMA cycle is not possible. The reaction time for an interrupt request may increase almost arbitrarily here if the workload of the system increases or if there are a large number of simultaneous DMA transfer processes. The number of simultaneous DMA transfer processes increases with the desired data transmission speed and is also determined by the magnitude of the data quantity to be transmitted.

There are known DMA controllers to which several memory access steps can be assigned for a single DMA cycle in order to reduce the number of DMA cycles required. The DMA controller of the peripheral interface carries out these steps independently and in turn communicates their completion to the driver software by an interrupt request. For this purpose, the control computer, for example, upon initiation of a DMA cycle, transmits a list of data blocks to be transferred to the DMA controller. This process is called "scatter gathering" or "chained DMA."

A common feature of the processes and arrangements mentioned above is the fact that the software of the control computer must specify detailed processing steps for the DMA controller of the peripheral interface and communicate them to the hardware in a timely manner before the still running data transmission ends so that the data stream is not interrupted. The response time of a peripheral device to instructions sent by the control computer and the response time of the control computer to a transmitted change in a state of the peripheral device are therefore determined in particular by the data transmission rate of the respective peripheral interfaces, which, in turn, depend, inter alia, on how often the control computer must intervene in the course of the data transmission.

The unburdening of the CPU of the control computer by special input/output processors, e.g., type 8089, for conducting data transfer processes, is conventionally used. For this purpose, the controller tasks of the data transfer can be accepted in part by such an I/O processor instead of the software program executed by the CPU. I/O processors can be programmed for independent transfer of data between individual links of the system bus without assistance from the main processor. However, their use is expensive and requires a relatively large amount of installation space. Their programming is also costly and inflexible. An I/O processor also generates an interrupt request to the CPU of the control computer at the end of a transmission, which must react in a time-critical manner so that the data flow is not terminated. Therefore, for time-critical data transfers, a real-time enabled operating system must nevertheless be used.

In the known processes for control and data recording by laser scanning microscopes (LSM), the data segments to be transferred are typically in the form of an uninterrupted data stream. Transfer of the data segments must be initiated anew each time and amounts to only about 10 kilobytes in each case. The size of these data segments is determined essentially by the size of the memory of the necessary buffering devices of the control computer and peripheral interface. These buffer devices with a fast, static memory are available only in a limited memory size and are very expensive. In such cases, the longest reaction times to interrupt requests of fewer than 200 μs are required in which, if necessary, new data must be computed and delivered later. The conventional peripheral interfaces used in LSM systems therefore impose high operating costs on the control computer in the form of short reaction times of the driver software coupled with frequent interrupt requests. If the driver software, i.e. the control computer, reacts too slowly, there is no consistent stream of control data and/or the incoming data is lost. In the case of interruption of the control data stream, components of the LSM, e.g., the scanner mirrors, may be damaged, which must be avoided. These critical requirements on an LSM system were previously fulfilled only with the aid of a real-time operating system. In the case of a non-real-time enabled operating system, a much lower data transfer speed had to be used. As a consequence, scanning processes on a sample must be performed only at a low speed or only a small number of detection channels can be used.

Thus, the present invention has the objective of improving a peripheral interface of the type mentioned initially in such a way that, especially in the case of a non-real-time-enabled operating system of the control computer, operating costs are reduced and data can be transferred at a high transfer rate without gaps and without losses between the control computer and the peripheral device. In particular, the intention is to permit the fast transfer of large volumes of data in LSM systems.

BRIEF SUMMARY OF THE INVENTION

According to the invention, a control unit prepares for the control computer a progress report of the data transfer for retrieval and a progress report of the processing of the buffer can be communicated independently of the transmission to the control unit of the control computer, i.e. the CPU, in which case it considers the progress of the processing when accessing the buffer. The preparation of the transfer progress report can be done continuously or upon request by the control computer. The control unit of the peripheral interface in this case operates independently of the CPU of the control computer. The control unit is physically separated from the CPU of the control computer and can be connected to it via the system bus. The memory access of the control unit to the RAM of the control computer in this case can be accomplished directly or indirectly via the system bus, preferably by direct memory access (DMA). Indirect memory access is present, for example, if the RAM or at least parts of the RAM must be interim-buffered in another (address) range before the data can be transferred to its real destination. This can be done, e.g., by the CPU or another DMA controller.

This peripheral interface and the corresponding operating procedure take care of the strict separation between the software of the control computer found in the state of the art, executed by its CPU and the hardware of the peripheral interface, in that the peripheral interface through its control unit, accepts conventional software assignments, and thus the control of a data transfer process is no longer left up to the software alone. The software, and therefore the control computer, sets for the hardware a certain frame of action for this purpose, within which the hardware can then perform independent operations. For data transfer from the control computer to the peripheral device, the control computer makes one or more rather large RAM spaces available as a read buffer to the peripheral interface. The control computer files/saves the data stream being transferred in the memory range shared by the control computer and the peripheral interface and reports this range to the control computer. The peripheral interface can use this memory range independently without requiring further instructions from the control computer. The peripheral interface reads and sends the data stream stored in the common memory automatically, without assistance from the control computer, to the peripheral device and informs the control computer, i.e. the software, only of the status of the reading process. As a result, data quantity, transfer time and buffer fullness can be varied continuously. No interrupt requests requiring a time-critical response for parameterization of the continuation of the data transfer are necessary so that if the buffer is sufficiently large, a real-time-enabled operating system can be dispensed with.

The size of the amount of data (in other words, the length of an uninterrupted segment of a data stream) that can be transferred without an interrupt request can advantageously amount to several megabytes since the memory size of the buffer device no longer has a limiting effect. In conventional processes, conversely, for about every 10 kilobytes, an operation would have to be carried out by the software, caused by an interrupt request. To be certain, in the state of the art, with the well-known 'scatter gathering' process, the possibility exists of working with larger areas of memory in order to transfer an increased volume of data without intervention by the control computer software, but in this case a flow control by continuous feedback is impossible. The limited memory size of the buffer devices required in this case also limits, as described initially, the size of the data segments. This also applies to the initially described I/O processors.

In a first embodiment, the control unit of the control computer is, on the one hand, a range (address range) of a source RAM configured as a read buffer, and on the other, as progress of the buffer processing, a position can be communicated especially of data to be transferred to the peripheral device, in which case it reads the data via the direct memory access from the source RAM range and transmits them via the peripheral hookup. The position of the data to be transferred is preferably independent of the reading process and, in particular, can be repeatedly extended, whereupon the control unit extends the reading and transfer to the extended position of data.

In particular, the inventive peripheral interface, through the course of retrievable reports as well as the inventive process, already permits new data to be stored in the memory range during the data transmission and the peripheral interface to be informed in the form of the processing state of the buffer of the presence of these new data. As a result, the data transmission from the control computer to the peripheral device can be extended seamlessly and without the interrupt requests initiated by the peripheral interface, but rather on the initiative of the control computer, e.g., when the control computer has completed a new control data stream segment. For this purpose, the peripheral interface does not have to be informed explicitly of what is to be transmitted to the peripheral device nor when the data is transmitted, since it is itself responsible for the continuation of the transmission at the correct time. The peripheral interface accepts, e.g., as an altered processing state, independently of the reading process, only the starting address and the length of the new data in the buffer. It adds this information to an internal list of data to be transmitted, which it is working on sequentially. Thus, if the list has not been emptied by complete processing, a continuous transmission of a data stream capable of being extended at any time is possible.

In a second embodiment, the control unit, as described above, can be notified by the control computer of a destination RAM range as a write buffer. The control unit can then write an amount of data transmitted from the peripheral device by means of the direct memory access to the writing RAM range of the control computer, in which case, an upper (address) boundary for data being transmitted can be reported as progress of the buffer processing. Preferably, in such cases, the upper boundary is independent of the writing process and in particular repeatedly extendable, whereupon the control unit extends the writing as needed up to the extended upper boundary.

The transmission of data from the peripheral device to the control computer functions the same in the counter-direction. The software, therefore the control computer, reports to the hardware, and then to the peripheral interface, a RAM range as a write buffer in which the peripheral interface can store data without the involvement of the control computer. As a result, the data transmission from the peripheral device to the control computer can be seamlessly extended without interrupt requests. The software can also be informed by retrieving the transmission progress of the process, and based on this information, can obtain the valid data from the shared memory while the hardware is still storing data in the memory, but in a range that the control computer has marked as unoccupied by means of the processing state communicated to the peripheral interface. The peripheral interface then prepares the information for the control computer within the scope of the transfer progress as to where the new valid data are located. This information can be retrieved by the control computer independently of the transfer and especially with a prior interrupt request. For example, an interval timer can be installed on the application level for this purpose.

The buffers, especially the read and write buffers in this case, can be selected such that the reaction times of the control computer lie in the range of seconds without resulting in an overflow or idle running of the buffer in question or of the respective internal list of the peripheral interface. A real-time-enabled operating system is then not required. In this way, even with a non-real-time-enabled operating system, it is possible to master the complex controlling tasks of LSM systems without major losses of performance or reduction of the number of detection channels. With the invention, a very high data transfer rate is also possible since only a small amount of computing time is required by the CPU. The control computer instead has more computing time for receiving, processing and presentation or editing and finalizing the data. If the invention is used in an LSM system, then when a non-real-time enabled operating system of the control computer is used, due to the dynamic buffering and the asynchronous status reporting, transmission speeds are achieved that under otherwise identical conditions were previously possible only with real-time-enabled operating systems.

For both embodiments, the sending of data from the peripheral device to the control computer and vice versa can be implemented in parallel in the same peripheral interface if for two opposite, unidirectional data transmission channels, both a read buffer and also a write buffer are created with corresponding communications devices for retrieving progress reports and the reporting of data positions.

The peripheral interface of the invention and/or the transmission process requires the full performance capacity of the peripheral interface only when the peripheral interface can directly access the RAM. This is only possible when the peripheral interface is connected directly to the system bus, e.g. PCI (peripheral component interconnect) or PCIe (PCI express). In this case a bridge component may connect other system bus components, e.g. ISA (industry standard architecture) or CardBus and memory accesses without a driver.

In a possible variant of the invention, the control unit responds to the respective RAM (address) range as a ring buffer. The use of such a FIFO (first in, first out) buffer permits, on the one hand, simple communication between the control computer and the peripheral interface and, on the other hand, a very simple management of the buffer by the peripheral interface.

In the first embodiment, the control unit accepts a communication about the amount of data being transmitted advantageously from a read buffer. The communication is in the form of a first pointer (spatially) after an end of the data still to be transferred from the control computer. The control unit prepares for the control computer a communication about the progress in the form of a second pointer, which it continues counting during the read process, to the beginning of the data still being sent for retrieval. In this manner, only two pointers are necessary for the entire data transmission in the read direction. The quantity of data being exchanged between the control computer and the peripheral interface for setting up and carrying out the data transmission from the peripheral device is correspondingly small.

In the second embodiment, the control unit accepts, advantageously for a write buffer as a communication about the upper boundary of the amount of data being transmitted by the control computer, a first pointer after an end of an unoccupied buffer range of the control computer and prepares for the control computer as a communication about the progress a second pointer, which it continues counting during the write process, to a beginning of the already written data for retrieval. In this manner, only two pointers are necessary for the entire data transmission in the write direction. The quantity of data being exchanged between the control computer and the peripheral interface for initiating and extending the data transmission from the peripheral device to the control computer is correspondingly small.

The control unit preferably prepares, for one of the first pointers, a register in each case that can be written via the system bus, especially also readable, and, for one of the second pointers, a corresponding register that can be read via the system bus. This permits simple access of the control computer at high speed. The registers are advisably prepared via memory mapped addressing (memory mapped I/O).

The control unit advantageously initializes, when the control computer assigns itself a RAM range as a read or write buffer, the corresponding first pointer and the pertinent second pointer at the beginning of this memory range. This permits the economical use of the buffer, generally, and a ring buffer, in particular.

AS it continues to count, the control unit preferably issues an interrupt request to the control computer when one of the second counters reaches the value of the corresponding first counter. In this way, the control computer can be informed by a known method about an overflow of a write buffer (BUFFER OVERFLOW) and of an underrun of a read buffer (BUFFER UNDERRUN) and thereby about a threatening loss of data or of a threatening interruption of the transfer.

The RAM range in each case is advisably composable in the manner of a scatter gathering process of scattered memory blocks, while the control unit can be notified of a corresponding list of memory blocks in order to assign the RAM range. A first such list can be transferred for a read buffer, and a second list for a write buffer.

The peripheral connection can advantageously be designed as an I/O bus. In this way several peripheral devices can be connected to the same peripheral hookup. Preferably, the computer hookup and/or the peripheral hookup is created by means of a suitable plug connection and is detachable. In this way, the peripheral interface can be configured as a replaceable plug-in card.

First a non-displaceable, non-pageable range of the RAM of the control computer is reserved by the software of the control unit and reported to the peripheral interface. When data being transferred to the peripheral device are identified, the data to be transferred are written in the reserved memory range adjacent to data not yet transferred, and the peripheral interface is notified of a position, especially the final address, of the written data as processing progresses. If data transferred are identified in the reserved memory range on the basis of the transfer progress report from the peripheral device prepared by the peripheral interface, the transferred data are read from the reserved memory range, and the peripheral interface is notified of the position of the data not yet read, especially the starting address, as processing progresses.

Additionally, by means of a control unit of the peripheral interface from the control computer, a destination RAM range is accepted as a write buffer, and an amount of data transferred from the peripheral device is written in the write RAM range of the control computer, while as progress of the buffer processing an upper boundary is accepted for the data being transferred independently of the write process and, in particular, is repeatedly extended, whereupon the writing is extended as necessary up to the upper boundary.

Alternatively or in addition to this, by means of the control unit of the peripheral interface, a source RAM range is accepted from the control computer as a read buffer and the position of data being transferred to the peripheral device is accepted as progress of the buffer processing independently of the read process and, in particular, is repeatedly extended, in which case the data from the source RAM range are read and transmitted via the peripheral port and upon the reporting of an extended position, the reading and transfer to the extended amount of data is extended.

The invention encompasses, besides the peripheral interface and the processes to be executed by the control unit and the control computer respectively, also a computer program that is designed to carry out the process, in particular a firmware program for an interface control unit and a control computer with a peripheral interface, to carry out the process of the invention as well as a laser scanning microscope system that contains such a control computer and a laser scanning microscope with at least one component that can be connected via a peripheral interface, according to the invention, with the control computer.

In the following the invention is explained in more detail by way of an example of its embodiment.

BRIEF DESCRIPTION OF THE SEVERAL VIEWS OF THE DRAWINGS

The drawings show.

In all drawings, the corresponding parts have the same reference numbers/symbols.

DETAILED DESCRIPTION OF THE INVENTION

Figure 1:
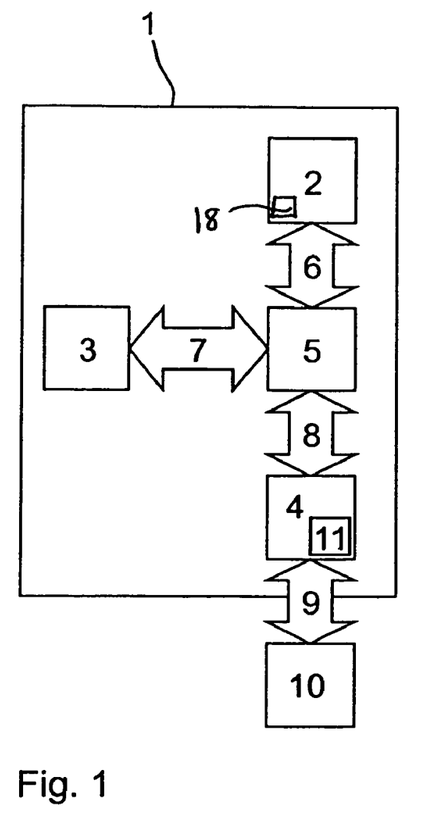
FIG. 1 is a block diagram of a first control computer with a connected peripheral device.

FIG. 1 shows a control computer 1 with a CPU (central processing unit) 2, a RAM (random access memory) 3, a peripheral interface 4 according to the invention and a bridge component 5 as a connecting link between a processor bus 6 which connects the CPU 2 to the bridge component 5, a memory bus 7 which connects the RAM 3 to the bridge component 5 and a system bus 8 which connects the peripheral interface 4. A peripheral device 10, external to the control computer 1 is connected to the peripheral interface 4 via a peripheral bus 9. The bridge component 5 mediates memory accesses without driver expense for the CPU 2. In this way, a control unit 11 of the peripheral interface 4 can access the RAM 3 of the control computer 1 directly via the system bus 8 for both reading and writing. The control unit 11 is designed as a field programmable gate array (FPGA). The data transmission process in this case is coded in the firmware and respectively in the FPGA program of the FPGA.

The peripheral interface 4 is designed, for example, as a PCI express plug-in card with a detachable system bus connection (not shown) and includes, for example, in each case, a buffer memory (not shown) with a size of 8 kilobytes for each transmission direction. The first buffer memory serves for intermediate storage of data that was read out from the read buffer 16 (FIG. 3) of the control computer 1 before further transmission via the peripheral bus 9 to the peripheral device 10. The second buffer memory serves for intermediate storage of data received via the peripheral bus 9 from the peripheral device before writing in the write buffer of the control computer 1. In other embodiments, other buffer memory sizes can also be provided.

Figure 2:
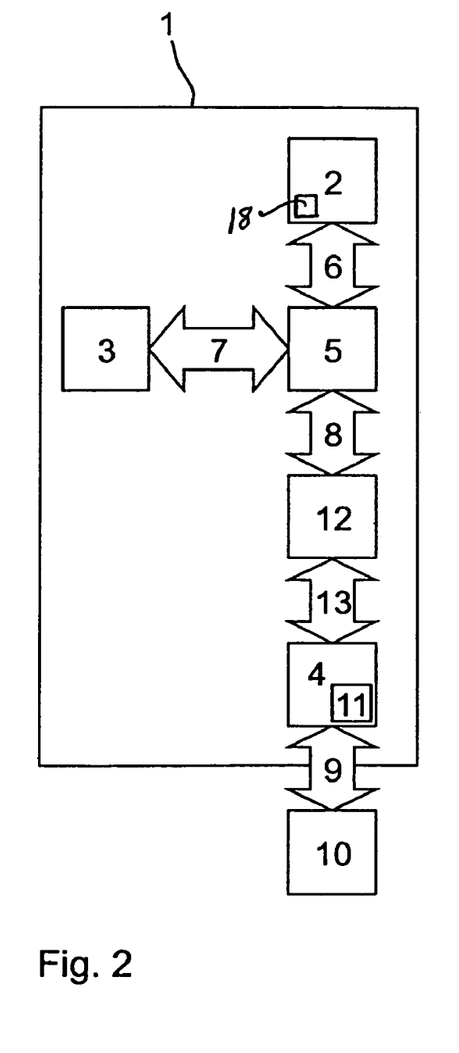
FIG. 2 is a block diagram of a second control computer with a connected peripheral device.

Direct access by the control unit 11 to the RAM 3 is also possible in the configuration shown in FIG. 2. Here, the peripheral interface 4 of the invention is connected via a second bridge component 12 and an intermediate bus 13 to the system bus 8. Because of the interposition of the second bridge component 12, the direct memory accesses are accordingly delayed in this configuration. Here also, the peripheral interface 4 is designed not as a simple plug-in card as shown in FIG. 1, but in this example, as a card bus plug-in card.

The implementation of the process of the invention is possible both with the configuration of FIG. 1 and also with the configuration of FIG. 2. In both configurations, the plug-in card in each case may display as a peripheral connection, e.g., an LVDS interface (low voltage differential signaling interface).

The process of the present invention and the peripheral interface 4 can be realized in different ways. One possibility is to create in the RAM 3 one or more virtual FIFO (first in first out) buffers for access by the control unit 11 of the peripheral interface 4. In this case, any type of FIFO buffer that is mapped in the RAM may be used, e.g. a ring buffer. An arrangement of different, non-contiguous memory ranges may also be used. The non-contiguous memory ranges are sequentially addressed by an algorithm, e.g., by respective pointers to the next memory range.

In alternative versions (not shown), RAM in addition to the peripheral interface 4, can be integrated in the address range of the CPU 2 of the control computer 1, in particular in the range of the RAM 3 of the control computer 1, appears (is "memory-mapped" and is used as a buffer. The shared buffer memory range of peripheral interface 4 and control computer 1 is not physically in the peripheral interface, but as in the embodiments described above, it is a part of the RAM 3 of the control computer.

In other alternative versions (not shown), an additional RAM that is not displayed (not memory mapped) in the address range of the CPU 2 of the control computer 1, can be integrated into the peripheral interface 4. This additional RAM is/are the buffer(s) 16, 17 set up for data transmission according to the invention. Data transfer between the peripheral interface 4 and the control computer 1 and vice versa is accomplished by DMA accesses of the peripheral interface 4 to the RAM 3 of the control computer 1, e.g. by using interrupt requests to the CPU 2 when the write buffer 17 is full and the read buffer 16 empty. The additional RAM in this case is managed by the peripheral interface 4. In such hybrid variants, the frequency of the interrupt requests is higher than in the previously mentioned embodiments, which require practically no interrupt requests, but advantageously lower than in the prior art since the size of the necessary buffer components plays no part. In this way, data segment sizes of a few hundred kilobytes each can be transferred without interrupt requests.

Figure 3:
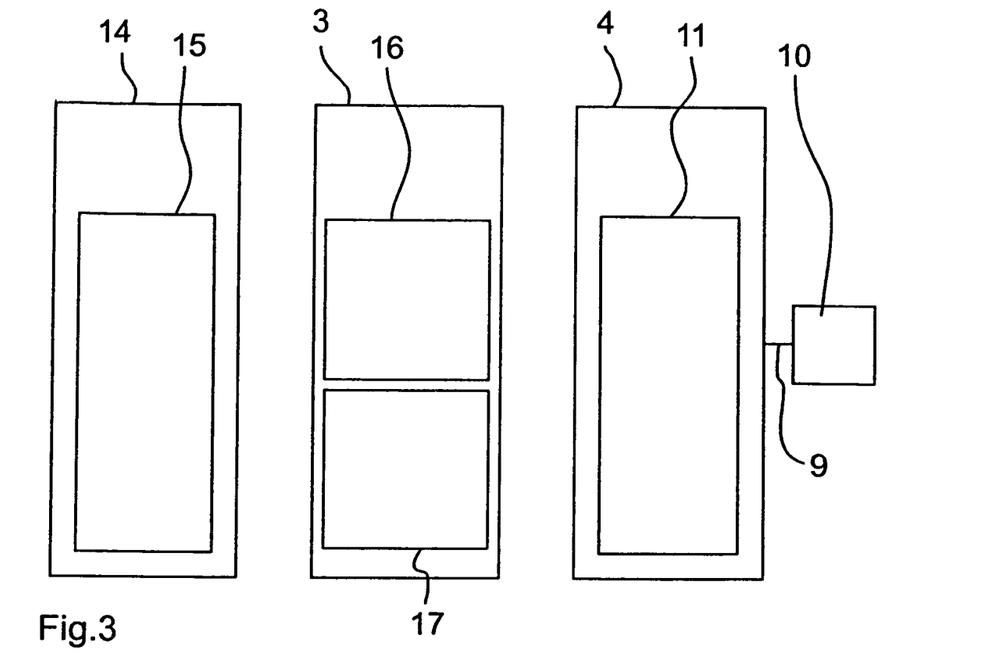
FIG. 3 is a schematic diagram of the arrangement of buffers in the RAM of the control computer.

FIG. 3 shows the creation of buffers by the control computer 1 in its RAM 3. The CPU 2 executes a software program 14 in which subprograms are provided with software logic 15 for carrying out the part of the process of the invention involving the control computer 1. Independently of the software 14 and the CPU 2, the control unit 11 of the peripheral interface 4 executes the complementary part of the process of the invention. In the case of two oppositely directed one-way data streams, the software 14 advantageously reserves a read buffer 16 and a write buffer 17. The read buffer 16 serves the control computer 1 for storing data read by control unit 11 and to be transferred to peripheral device 10 by the software 15. The write buffer 17 serves the peripheral interface 4 for storing data received from peripheral device 10 and to be read by software 14 via the control unit 11. Both buffers are addressed, e.g., both by the control computer 1 and also by the peripheral interface 4 as ring buffers. However, the invention can also be realized with any other type of memory management.

Each of buffers 16 and 17 consists, e.g., of several distributed blocks of the RAM 3 assembled in the scatter gathering process into a virtual cohesive FIFO buffer. The buffers 16 and 17 are reserved by the software 14 as non-pageable and have a size of 32 Mbytes each. They may also be of different sizes depending on the amount of data. It is also possible to reserve one or both buffers as a physically coherent block. A cache 18 of the CPU 2 is deactivated for the address ranges in which the buffers 16 and 17 are found. After the reservation/allocation, the software 14 tells the control unit 11 the starting address and the size of the read buffer 16 and the write buffer 17. The control unit 11, for this purpose, makes two hardware registers available in each case. The hardware registers are memory mapped in the address range of the CPU 2.

Figure 4:
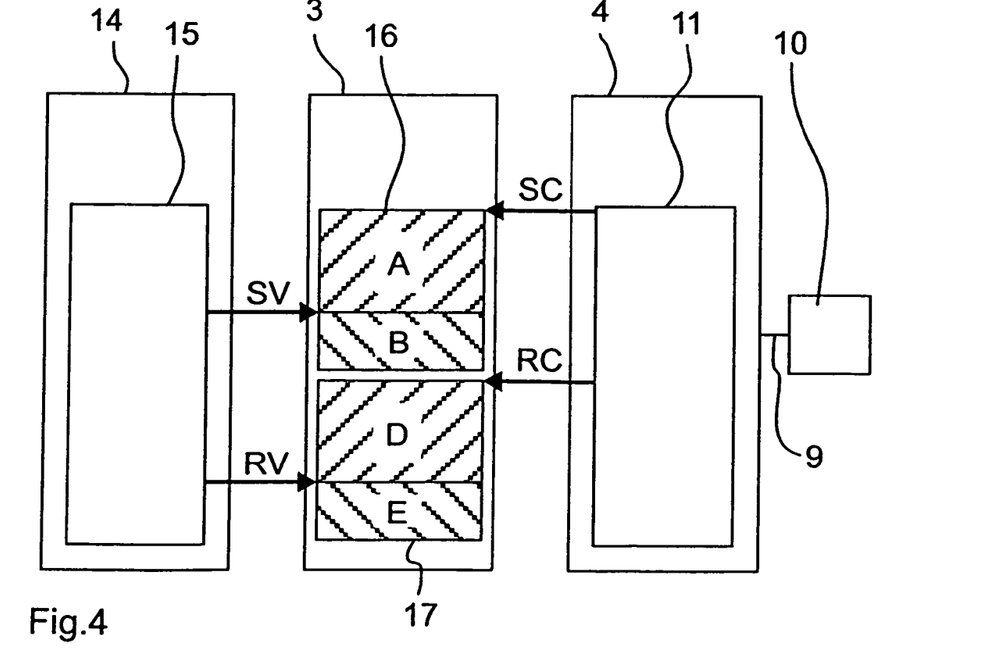
FIGS. 4, 5 and 6 are schematic diagrams of several states of the RAM during two simultaneous, opposite data transfer processes.

As understood from FIG. 4, the control unit 11 uses only two pointers in each case for managing the ring buffers 16 and 17 in addition to the starting addresses and sizes of the buffers 16, 17, which are accessible to the CPU 2 in other hardware registers. For the read buffer 16, it uses a first pointer SV after the end of the valid data still to be transferred and a second pointer SC at the end of the already transferred data and therefore at the beginning of the data still to be transferred. The control unit 11 reads only in the buffer range A between the second pointer SC and the first pointer SV. As a complement to this, the software 14 only writes in the buffer range B. For the write buffer 17, the control unit 11 uses a pointer RV after the end of the free buffer range and a second pointer RC at the beginning of the already written data. The control unit 11 writes only in the buffer range D between the second pointer RC and the first pointer RV, but not in the buffer range E.

The two hardware registers of the first pointers SV, RV are readable and writable by the CPU 2 of the control computer 1, therefore, by the software 14. They are not changed by the control unit 11 of the peripheral interface 4. The two hardware registers of the second pointers SC, RC are readable only by the CPU 2. They are incremented by the control unit 11 during the data transfer: The second read pointer SC is incremented each time the control unit 11 accesses the read buffer 16, by the number of data units read. Such access can be made in single data units such as bytes, words, double words or quad words. Alternatively, multiple data units can be read by means of a burst transfer, in one access. The second write pointer RC is incremented each time the control unit 11 accesses the write buffer 17, by the number of data units written. Such access can be made in single data units such as bytes, words, double words or quad words. Alternatively, multiple data units can be read by means of a burst transfer, in one access.

If the software 14 reports a RAM range to the control unit 11 as a read buffer 16 or as a write buffer 17, then the control unit 11 initializes the corresponding first pointer SV or RV, respectively, and the pertinent second pointer SC or RC, respectively, at the beginning of the memory range in question. By the pointer pairs SV/SC and RV/RC, respectively, it is now possible in each case for an independent access by the CPU 2 and the control unit 11 to the pertinent shared buffer memory range. By preparation of the pointers SV, SC, RV, RC in hardware registers, the access to them is automatically synchronized by the system bus 8.

Figure 5:
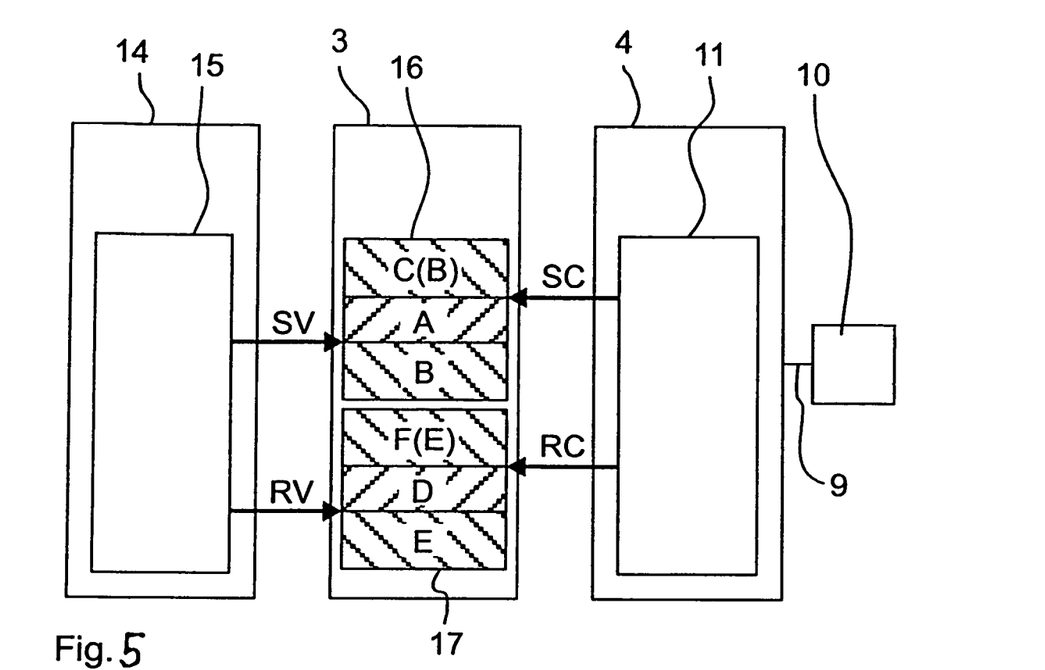
Figure 6:
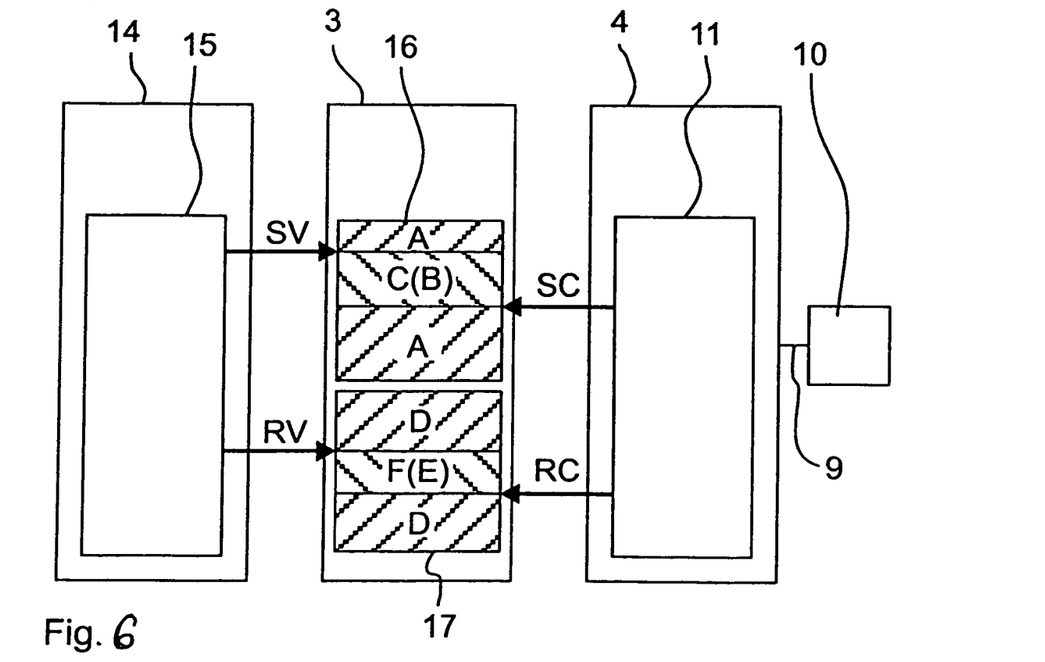

FIGS. 4 through 6 show three states of the RAM and the two pointer pairs during two simultaneously performed, independent data transfer processes in opposite directions. FIG. 4 shows the state in which the software 14 has already stored data that were to be transferred to the peripheral device 10 in the read buffer 16 and subsequently set the first pointer SV after the end of these data. In addition, the software 14, by setting the first pointer RV, has marked a part of the write buffer 17 as unoccupied so that the control unit 11 can store the data coming from the peripheral device 10 there. Regarding the second pointers SC, RC, which still point to the beginning of the respective buffers 16 and 17, it may be recognized that since the initialization, neither a read nor a write process have been carried out by the control unit 11.

The control unit 11 now identifies from the fact that the first pointer SV deviates from the second pointer SC that the data being transferred are present in buffer range A. The control unit 11 will then carry out read processes independently and continue counting the second pointer SC corresponding to the number of data units read and also transfer the read data via the appropriate internal buffer memory of the peripheral interface 4 to the peripheral device 10. The buffer range B has not yet been freed up for the transfer; here the software 14, independently of the accesses of the control unit 11 to the buffer range A, can access freely and add to the data being transferred.

Basically, the control unit 11 repeats its steps until the first pointer SV and the second pointer SC are identical again. This case can be avoided by the software 14 by the timely adding on of additional data and corresponding moving of the first pointer SV, which is uncritically possible in view of the buffer size of 32 MB even with a non-real-time-enabled operating system. Adding on additional data and the corresponding moving of the first pointer SV is possible for the software 14 independently of reading, continued counting and transfer processes so that aside from synchronized access via the system bus 8, no waiting times arise.

In the same manner, the control unit 11 recognizes from the deviation between first pointer RV and second pointer RC that a free/unoccupied buffer range D is present. The buffer range E has not yet been released for receiving. As soon as data from the peripheral device via the internal buffer memory, which are to be transferred to software 14, have arrived, the control unit 11 will write this data independently in the write buffer 17 and continue counting the second pointer RC corresponding to the number of written data units. Basically, it repeats these steps until no data are any longer present in the internal buffer memory or until the first pointer RV and second pointer RC are again identical.

This situation can be avoided by the software 14 by timely reading out the data from the write buffer 17 and releasing the read-out range by corresponding movement of the first pointer RV. This is also uncritically possible in view of the buffer size of 32 MB with a non-real-time-enabled operating system. The readout of the data and corresponding moving of the first pointer RV is possible for the software 14 independently of any transfer, writing and continued counting processes of the control unit 11 so that aside from synchronized access via the system bus 8, no waiting times arise. Renewed synchronization between the control unit 11 and the software 14 is not necessary.

In FIG. 5, a later state is shown in which the control unit 11 has already read data from the read buffer 16, correspondingly continued counting the second pointer SV, and transferred the valid data to the peripheral device 10. Due to the continued counting of the second pointer SV, a buffer range C is formed in which data that has been transferred but not yet read by the software 14 are contained. This buffer range C is part of the buffer range B, which the software 14 can freely access and add more data. The buffer range B has therefore become larger toward the rear with allowance for the buffer cycle. Besides this, the control unit 11 has already written data that it obtained from the peripheral device 10 into the write buffer 17 and continued counting the second pointer RC accordingly. As a result, a buffer range F has formed, in which data that has already been transferred but not yet read by the software are contained. Since this buffer range F has also not been released for writing, it can be regarded as part of buffer range E.

FIG. 6 shows another state in which the software 14 has stored other transferred data in the read buffer 16 and by corresponding movement of the first pointer SC has extended the buffer range A for this data. In addition, the software 14 has read the data received from the buffer range F and moved the first pointer RV accordingly. At this time the first pointers SV, RV have run once around the end of the ring buffers 16, 17. At the same time, the control unit 11 has received additional data from the peripheral device 10 and added the data to the buffer range F and continued counting the second pointer RC accordingly. As a result, the buffer range C now occupies the entire buffer range B. Likewise, the buffer range F now occupies the entire buffer range E. This is a result of the fact that the buffers 16, 17 are both completely filled with data only in this state.

Due to the continued counting of the second pointer SC, RC, the control unit 11 of the software 14 continuously prepares the progress of the transfer from the control computer 1 to the peripheral device 10 for retrieval, in which case the intermediate storage in the internal buffer memory of the peripheral interface 4 is not considered. By acceptance of the first pointers SV, RV by the control unit 11, independently of the write, read and transfer processes, the progress of the processing of the pertinent buffer 16, 17 can be communicated to it by the software 14, i.e., the adding on and reading out of data. Precious, time-critical interrupt requests can basically be dispensed with so that the time behavior of the software 14 can be configured much more loosely than in the prior art. As a result, for example, the interaction with a user is considerably improved because the software 14 can be optimized for a speedy reaction to operating actions by the user.

If one of the second counters SV, RV, upon continued counting, reaches the value of the corresponding first counter SC, RC, it is nevertheless conceivable that the control unit 11 will issue an interrupt request to the control computer 1 and therefore to the CPU 2. Following this, a pre-determined routine of the software 14 is executed in order to avert a threatening data loss or a threatening stop of the transfer by adding on data to be transferred or by reading out transferred data and corresponding movement of the pertinent first pointer SV, RV. Due to the time flexibility of the process, this case will occur only at the planned end of transfer. The interrupt request can serve in this way to indicate the end of the transfer.

With the inventive process and peripheral interface 4, compared to the DMA data transfer administered conventionally by the CPU 2 per interrupt request, a roughly triple data transfer rate is possible.

The invention can be used in various fields of application in laser scanning microscope systems. With a control computer 1 and correspondingly configured peripheral interface 4, it is possible for test purposes or for error search within the scope of the LSM development to put any microscope hardware into operation and test it. Only an adaptation of the application software 14 is necessary. As an alternative, it is possible in the maintenance sector, without the previously required hardware cost in an existing LSM system, to communicate with individual components to input new software versions or to identify defective components. Alternatively, the invention may be used in the regular operation in productive systems in order to achieve a high data throughput at low cost with a non-real-time enabled operating system.

LIST OF REFERENCE NUMBERS 1 control computer
2 central processing unit
3 random access memory
4 peripheral interface
5 bridge component
6 processor bus
7 memory bus
8 system bus
9 peripheral bus
10 peripheral device
11 control unit
12 bridge component
13 intermediate bus
14 software program
15 software logic
16 read buffer
17 write buffer
18 cache

What is claimed is:

1. A peripheral interface for connecting a control computer to a peripheral device, wherein the control computer includes a central processing unit (CPU), a system bus connecting the peripheral interface to the CPU, and a working memory, the peripheral interface comprising:
a system bus connection for operatively connecting the peripheral interface to the system bus;
a peripheral device connection for operatively connecting the peripheral interface to the peripheral device for the transmission of data from the peripheral device to the control computer via the system bus;
a direct memory access controller for accessing the working memory of the control computer via the system bus;
means for receiving a communication from the control computer identifying an area of the working memory to be used as a write buffer for the data to be transmitted between the peripheral device and the control computer;

means for accessing the write buffer via the system bus;

a control unit for writing the data into the write buffer via the direct memory access controller;

means for accepting information from the control computer on an address boundary of an amount of the data to be transmitted from the peripheral device to the control computer, wherein the information is in the form of a first pointer (RV) after an end of a free buffer zone, and wherein the information is accepted independently of the transmission of the amount of data from the peripheral device to the control computer; and means for preparing a progress report for retrieval by the control computer, wherein the progress report is in the form of a second pointer (RC) at a beginning of data already written to the write buffer;

wherein the control unit a) identifies a deviation between the first pointer (RV) and the second pointer (RC), b) thereupon independently without instructions from the control computer, writes data that have arrived in the internal buffer memory from the peripheral device into the write buffer and continues incrementing the second pointer (RC) in correspondence with the number of written data units, and c) repeats the writing of data and incrementing of the second pointer (RC) without synchronization with the control computer until the first pointer (RV) and second pointer (RC) are identical.

2. The peripheral interface as claimed in claim 1, wherein the boundary is independent of the write process and is repeatedly extendable, whereupon the control unit extends the writing when necessary up to the extended boundary.

3. The peripheral interface as claimed in claim 1, wherein the control unit treats the working memory zone as a ring buffer.

4. The peripheral interface as claimed in claim 1, wherein the control unit prepares for the first pointer (RV) a register that can be written via the system bus and for the second pointer (RC) a register that can be read out via the system bus.

5. Peripheral interface (4) as claimed in claim 1, further comprising an extra RAM which serves as a buffer for the data transmission instead of the RAM of the control computer.

6. A laser scanning microscope operatively connected to a control computer, the laser scanning microscope providing at least one component that can be connected via the peripheral interface as claimed in claim 1 with the control computer.

7. The method as claimed in claim 1, wherein the address boundary is an upper boundary.

8. The peripheral interface as claimed in claim 1, further comprising:

means for receiving a communication from the control computer identifying an area of the working memory to be used as a read buffer for the data to be transmitted between the peripheral device and the control computer;

means for accessing the read buffer via the system bus;

a control unit for reading the data from the read buffer via the direct memory access controller;

means for accepting information from the control computer on an address boundary of an amount of data to be transferred, wherein the information is in the form of a third point (SV) after the end of the data still being transferred, and wherein the information is accepted independently of the transmission of the amount of data from the peripheral device to the control computer; and means for preparing a progress report for retrieval by the control computer, wherein the progress report is in the form of a fourth pointer (SC) at a beginning of data still to be transferred;

wherein the control unit a) identifies a deviation between the third point (SV) and the fourth pointer (SC), b) thereupon independently without instructions from the control computer, reads data from the read buffer, transfers the read data to the peripheral device, and continues incrementing the fourth pointer (SC) in correspondence with the number of read data units, and c) repeats the reading of data, the transfer of the read data, and the incrementing of the fourth pointer (SC) without synchronization with the control computer until the third point (SV) and fourth pointer (SC) are identical; and wherein the control unit reads the data from the read buffer via the direct memory access controller, and the control unit prepares for one of the first and third pointers (SV, RV) a respective register that can be written via the system bus and for one of the second and fourth pointers (SC, RC) a respective register that can be read out via the system bus.

9. A peripheral interface for connecting a control computer to a peripheral device, wherein the control computer includes a central processing unit (CPU), a system bus connecting the peripheral interface to the CPU, and a working memory, the peripheral interface comprising:

a system bus connection for operatively connecting the peripheral interface to the system bus;

a peripheral device connection for operatively connecting the peripheral interface to the peripheral device for the transmission of data from the peripheral device to the control computer via the system bus;

a direct memory access controller for accessing the working memory of the control computer via the system bus;

means for receiving a communication from the control computer identifying an area of the working memory to be used as a read buffer for the data to be transmitted between the peripheral device and the control computer;

means for accessing the read buffer via the system bus;

a control unit for reading the data from the read buffer via the direct memory access controller;

means for accepting information from the control computer on an address boundary of an amount of data to be transferred, wherein the information is in the form of a first pointer (SV) after the end of the data still being transferred, and wherein the information is accepted independently of the transmission of the amount of data from the peripheral device to the control computer; and means for preparing a progress report for retrieval by the control computer, wherein the progress report is in the form of a second pointer (SC) at a beginning of data still to be transferred;

wherein the control unit a) identifies a deviation between the first pointer (SV) and the second pointer (SC), b) thereupon independently without instructions from the control computer, reads data from the read buffer, transfers the read data to the peripheral device, and continues incrementing the second pointer (SC) in correspondence with the number of read data units, and c) repeats the reading of data, the transfer of the read data, and the incrementing of the second pointer (SC) without synchronization with the control computer until the first pointer (SV) and second pointer (SC) are identical.

10. The peripheral interface as claimed in claim 9, wherein the position of the data to be transferred is independent of the reading process and can be repeatedly extended, whereupon the control unit extends the reading and data transfer to the extended position of the data.

11. The method as claimed in claim 9, wherein the address boundary is an upper boundary.

12. The peripheral interface as claimed in claim 9, wherein the control unit prepares for the first pointer (SV) a register that can be written via the system bus and for the second pointer (SC) a register that can be read out via the system bus.

13. A method for operating a peripheral interface (4) used with a peripheral device (10), a control unit, and a control computer (1) having a system bus (8) and a random access memory (RAM), comprising the steps of:
 operatively connecting the system bus (8) of the control computer and the peripheral device (10) for one-way transmission of an amount of data from the control computer (1) to the peripheral device (10) via the system bus (8) to a presettable work memory region of the control computer serving as a buffer or to an extra random access memory (RAM) integrated in the peripheral interface, which serves as a buffer;
 accepting from the control computer independently of the transmission, as information on the amount of data to be transferred, a first pointer (SV) after the end of the data still being transferred;
 preparing for the control computer as a report on the progress for retrieval, a second pointer (SC) at a beginning of the data still to be sent;
 identifying a deviation between the first pointer (SV) and the second pointer (SC);
 upon identification of the deviation, independently without instructions from the control computer, reading data from the read buffer, transferring the read data to the peripheral device, continuing to increment the second pointer (SC) in correspondence with the number of read data units, and repeating the reading, transferring, and incrementing without synchronizing with the control computer until the first pointer (SV) and second pointer (SC) are identical.

14. The method as claimed in claim 13, further comprising the step of:
 accepting a target working memory zone as a write buffer by means of a control unit of the peripheral interface of the control computer; and
 writing an amount of data transferred by the peripheral device in the write working memory zone of the control computer;
 transferring, at the time during buffer processing, a boundary (RV) for the data to be transferred; and
 accepting the RV independently of the writing step and extending the writing when necessary up to the RV.

15. The method as claimed in claim 13, further comprising the step of:
 accepting a source working memory zone as a read buffer (16);
 accepting a position (SV) of the data to be transferred to the peripheral device (10) as progress of the buffer processing occurs independently of the reading process; and
 reading the data from the source working memory zone and transferring the data via the peripheral connection; and
 upon notification of an extended position (SV), extending the reading and the data transfer to the extending amount of data.

16. The method as claimed in claim 13, wherein the address boundary is an upper boundary.

* * * * *